(12) United States Patent
Lafountain et al.

(10) Patent No.: US 10,211,654 B2
(45) Date of Patent: Feb. 19, 2019

(54) PERSONAL ASSISTANT MOUNTING STAND AND POWERING DEVICE

(71) Applicants: Judd Eric Lafountain, Weston, FL (US); Michael E. Rivera, Weston, FL (US)

(72) Inventors: Judd Eric Lafountain, Weston, FL (US); Michael E. Rivera, Weston, FL (US)

( * ) Notice: Subject to any disclaimer, the term of this patent is extended or adjusted under 35 U.S.C. 154(b) by 113 days.

(21) Appl. No.: 15/393,019

(22) Filed: Dec. 28, 2016

(65) Prior Publication Data

US 2017/0187206 A1 Jun. 29, 2017

Related U.S. Application Data

(60) Provisional application No. 62/271,525, filed on Dec. 28, 2015.

(51) Int. Cl.
*H02J 7/00* (2006.01)

(52) U.S. Cl.
CPC .......... *H02J 7/0027* (2013.01); *H02J 7/0044* (2013.01); *H02J 7/0045* (2013.01); *H02J 7/0054* (2013.01)

(58) Field of Classification Search
None
See application file for complete search history.

(56) References Cited

U.S. PATENT DOCUMENTS

| 2008/0226096 A1* | 9/2008 | Waddell | H04R 1/02 381/87 |
|---|---|---|---|
| 2014/0321686 A1 | 10/2014 | Wegener | |
| 2017/0215004 A1 | 7/2017 | Wengreen | |

OTHER PUBLICATIONS

U.S. Appl. No. 62/286,093; titled Speaker Power Supplies, filed Jan. 22, 2016; in USPTO Public Pair (Evidence of Publication Attached).
U.S. Appl. No. 62/271,525; titled Battery Pack Device for the Amazon ECHO, filed Dec. 28, 2015, published in USPTO Public Pair (Evidence of Publication Attached).

* cited by examiner

*Primary Examiner* — David V Henze-Gongola

(57) ABSTRACT

A portable device-powering system is used to power a personal assistant device when an outlet is not accessible. The system includes a support stand, a rechargeable battery pack, a device power cord, and an adapter port. A base and a tubular body of the support stand house the rechargeable battery pack. A divider cap of the support stand is connected into the tubular body and is used to support a personal assistant device. The device power cord is electrically connected to the rechargeable battery pack and, when connected to the personal assistant device, allows the rechargeable battery pack to power the personal assistant device. The adapter port is mounted into the tubular body and is electrically connected to the rechargeable battery pack. The adapter port may be connected to an external power supply in order to charge the rechargeable battery pack.

12 Claims, 7 Drawing Sheets

PERSONAL ASSISTANT MOUNTING STAND AND POWERING DEVICE

The current application claims a priority to the U.S. Provisional Patent application Ser. No. 62/271,525 filed on Dec. 28, 2015.

FIELD OF THE INVENTION

The present invention relates generally to portable power systems. More particularly, the present invention is a portable device-powering system that is used to provide electricity for a personal assistant device so that a wired connection to an external power supply is not necessary.

BACKGROUND OF THE INVENTION

Personal assistant devices are commonly used in the home or office to simplify everyday tasks and perform a number of functions otherwise provided by one or more separate devices. Some personal assistant devices, such as the Amazon Echo, are designed to be used with an external power supply such as a wall outlet. Specifically, the Echo does not include a battery pack, minimizing the possibility of portable use. As a result, the Echo and other similar personal assistant devices may not be usable during tailgates, picnics, or other activities performed outside or away from home. Accordingly, there is a present need for a system which can be used to power personal assistant devices like the Echo. The present invention is a portable device-powering system which acts as a mounting stand for the personal assistant device and provides power for the personal assistant device when an outlet is not accessible. The system includes a rechargeable battery pack which is used to power the personal assistant device. When an outlet is readily available, an adapter port may be connected to the outlet and used to power the personal assistant device and charge the rechargeable battery pack.

DETAILED DESCRIPTION OF THE INVENTION

Figure 1:
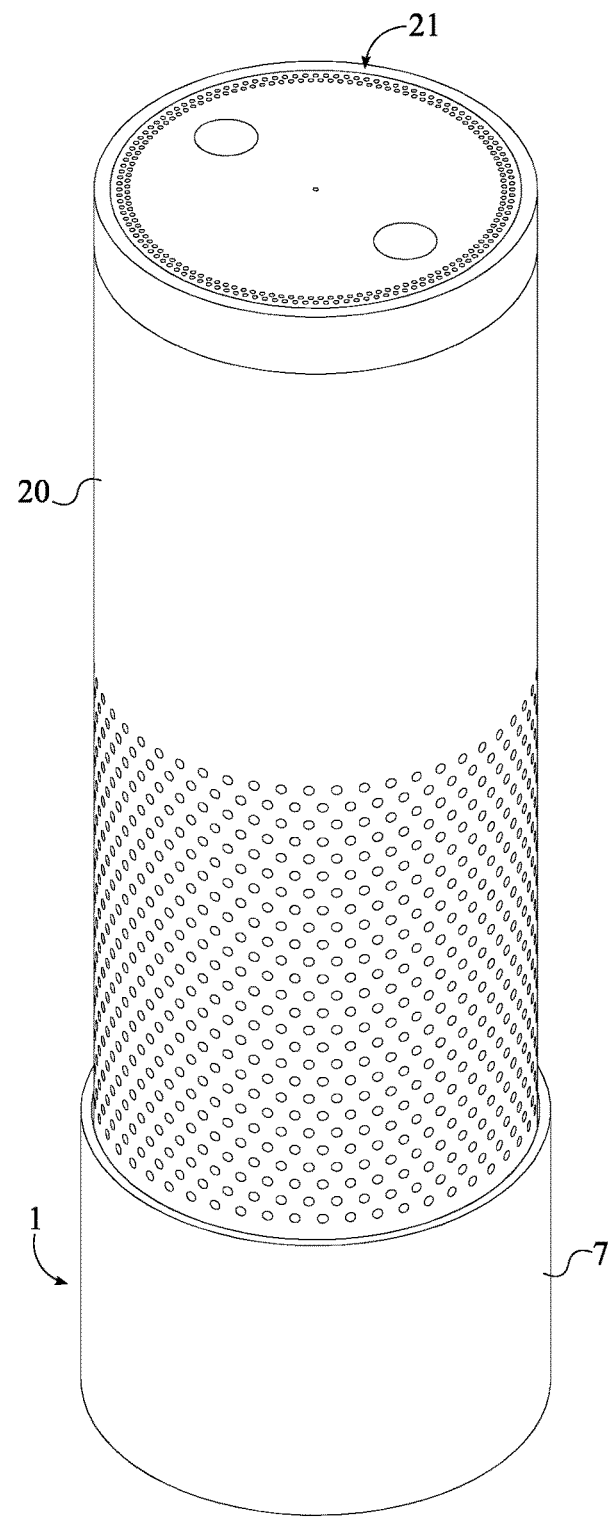
FIG. 1 is a top perspective view of the present invention.

All illustrations of the drawings are for the purpose of describing selected versions of the present invention and are not intended to limit the scope of the present invention.

With reference to FIGS. 1-3 and FIG. 7, the present invention is a portable device-powering system that may be used to power an electronic device that otherwise requires a wired electrical connection to a wall outlet or another similar power source. The present invention comprises a support stand 1, a rechargeable battery pack 10, a device power cord 13, and an adapter port 14. The support stand 1 is used to hold a personal assistant device. In general, personal assistant devices are used to simplify everyday activities providing a range of features including clock and timer functions, a calculator function, a weather forecast function, and a calendar function, and many others. Specifically, the support stand 1 is designed to fit an Amazon Echo; however, the support stand 1 may be alternatively used with other personal assistant devices. The support stand 1 comprises a base 2, a divider cap 3, and a tubular body 7. The tubular body 7 is perimetrically connected around the base 2. Together, the tubular body 7 and the base 2 house the rechargeable battery pack 10. The divider cap 3 is perimetrically connected into the tubular body 7 and is offset from the base 2. The divider cap 3 has a dual functionality in that the divider cap 3 protects the rechargeable battery pack 10 and helps to support the personal assistant device. The rechargeable battery pack 10 is positioned in between the divider cap 3 and the base 2 and is used to power the personal assistant device. The adapter port 14 is laterally mounted into the tubular body 7, in between the divider cap 3 and the base 2. The adapter port 14 is electrically connected to the rechargeable battery pack 10. This arrangement allows the rechargeable battery pack 10 to be recharged when an external power supply is connected to the adapter port 14. The device power cord 13 is electrically connected to the rechargeable battery pack 10. The device power cord 13 is used to connect the rechargeable battery pack 10 to the personal assistant device, allowing the personal assistant device to be powered without an external power supply.

Figure 2:
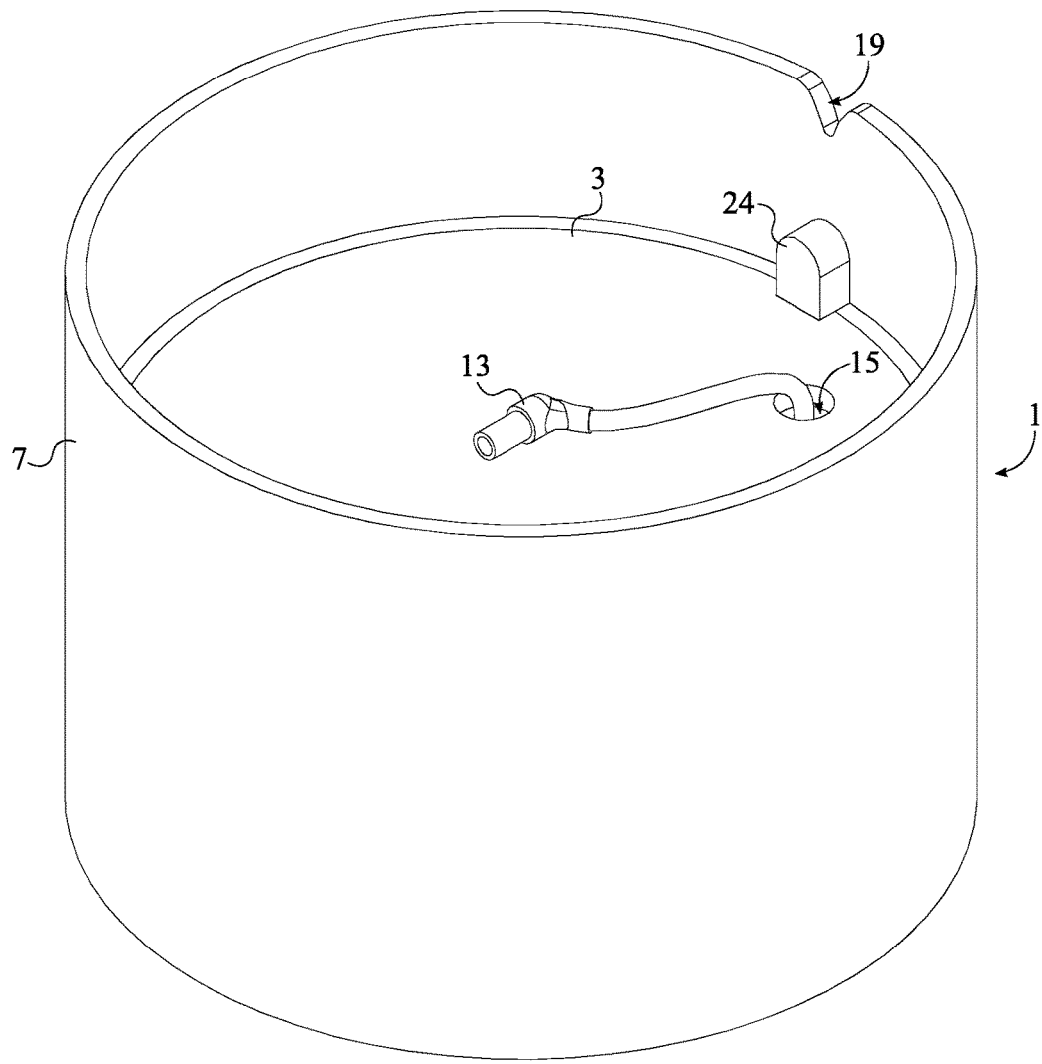
FIG. 2 is a top perspective view of support stand.
Figure 3:
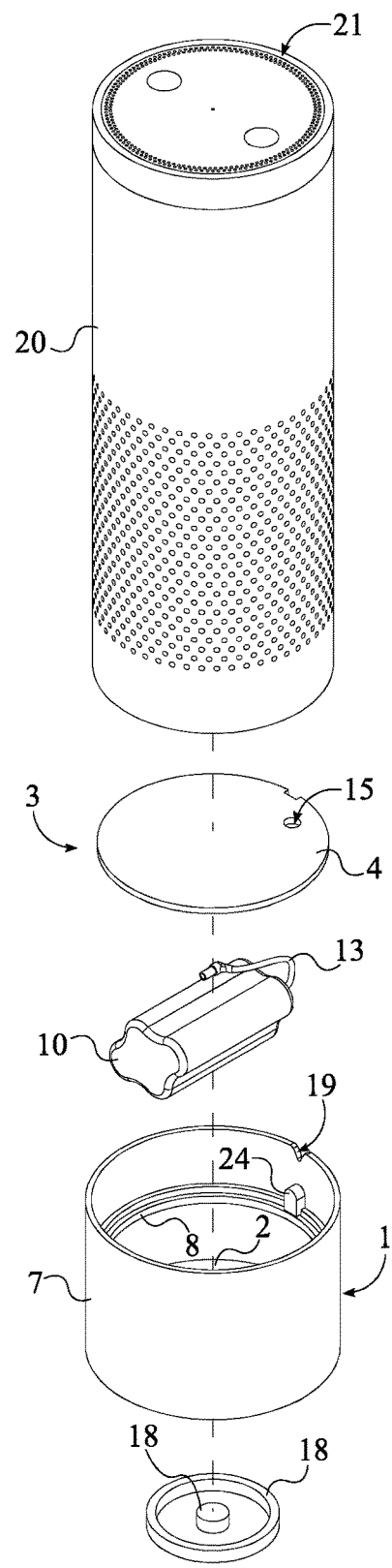
FIG. 3 is an exploded top perspective view of a first embodiment of the present invention, wherein the support stand comprises a support lip in the first embodiment.

In a first embodiment of the present invention, shown in FIG. 2, the support stand 1 further comprises a support lip 8. The support lip 8 is laterally connected into the tubular body 7 and is used to hold the divider cap 3 in position. The support lip 8 is positioned offset from the base 2. This arrangement creates space for the rechargeable battery pack 10 to fit between the base 2 and the divider cap 3. The divider cap 3 is connected adjacent to the support lip 8, opposite to the base 2. This arrangement allows the divider cap 3 to be lifted from the support lip 8, creating access to the rechargeable battery pack 10.

In reference to FIG. 2, the present invention further comprises an alignment protrusion 24. The alignment protrusion 24 is used to engage with the personal assistant device to prevent the personal assistant device from rotating while mounted onto the support stand 1. In the first embodiment of the present invention, the alignment protrusion 24 is laterally connected into the tubular body 7 and is positioned adjacent to the divider cap 3. By precisely orienting the personal assistant device relative to the support stand 1, the alignment protrusion 24 helps to ensure that the process of attaching the personal assistant device to the support stand 1 is simple and easy.

Figure 5:
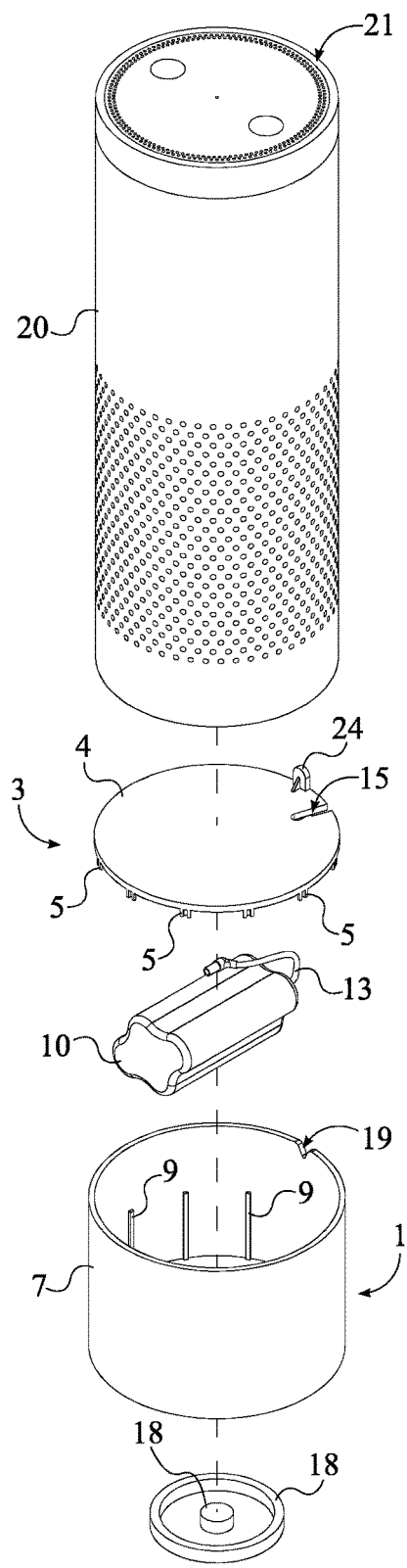
FIG. 5 is an exploded top perspective view of a second embodiment of the present invention, wherein the support stand comprises a plurality of cap-locking struts in the second embodiment.
Figure 6:
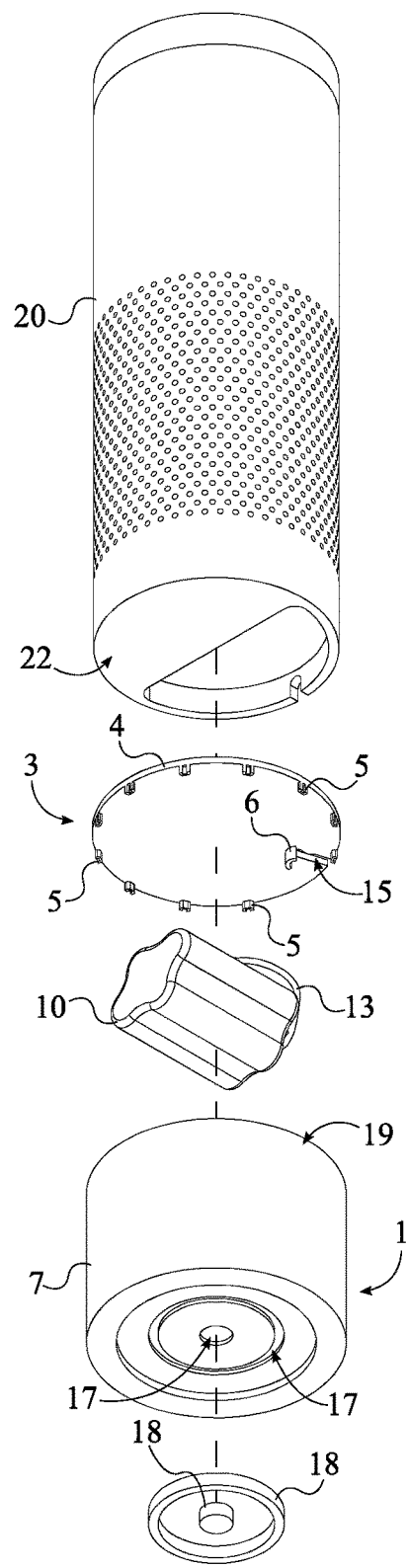
FIG. 6 is an exploded bottom perspective view of the second embodiment of the present invention.

In a second embodiment of the present invention, shown in FIGS. 5-6, the support stand 1 further comprises a plurality of cap-locking struts 9. Similar to the support lip 8, the plurality of cap-locking struts 9 is used to support the divider cap 3. The plurality of cap-locking struts 9 is laterally connected into the tubular body 7. The divider cap 3 comprises a platform 4 and a plurality of support feet 5. The plurality of support feet 5 is used to secure the divider cap 3 atop the plurality of cap-locking struts 9. The plurality of support feet 5 is connected normal to the platform 4 and is oriented towards the base 2. Further, the plurality of support feet 5 is equally distributed around the platform 4. This arrangement helps to evenly distribute the weight of the personal assistant device. Each of the plurality of support feet 5 is mounted onto a corresponding strut from the plurality of cap-locking struts 9. This arrangement prevents the divider cap 3 from rotating within the tubular body 7, securing the position of the personal assistant device.

In the second embodiment of the present invention, the alignment protrusion 24, shown in FIG. 5 is connected normal to the platform 4, opposite to the base 2. Similar to the first embodiment of the present invention, the alignment protrusion 24 is used to lock the orientation of the personal assistant device relative to the support stand 1. The alignment protrusion 24 is peripherally positioned on the platform 4. The engagement between the alignment protrusion 24 and the personal assistant device, along with the engagements between the cap-locking struts 9 and the support feet 5 prevent the personal assistant device and the support stand 1 from rotating relative to each other. This ensures that each component may be assembled and disassembled in a repeatable manner.

In reference to FIG. 2 and FIG. 5 the present invention further comprises a cord channel 15. The cord channel 15 traverses through the divider cap 3, allowing the device power cord 13 to bypass the divider cap 3 and connect to the personal assistant device.

In reference to FIG. 6, the divider cap 3 further comprises a cord protector 6. The cord protector 6 is connected normal to the platform 4 and is used to prevent the device power cord 13 from being pinched between the divider cap 3 and the rechargeable battery pack 10. The cord protector 6 is positioned adjacent to the cord channel 15 and is oriented towards the base 2. Because the cord protector 6 is positioned adjacent to the cord channel 15, the cord protector 6 also helps to guide the device power cord 13 through the cord channel 15.

Figure 7:
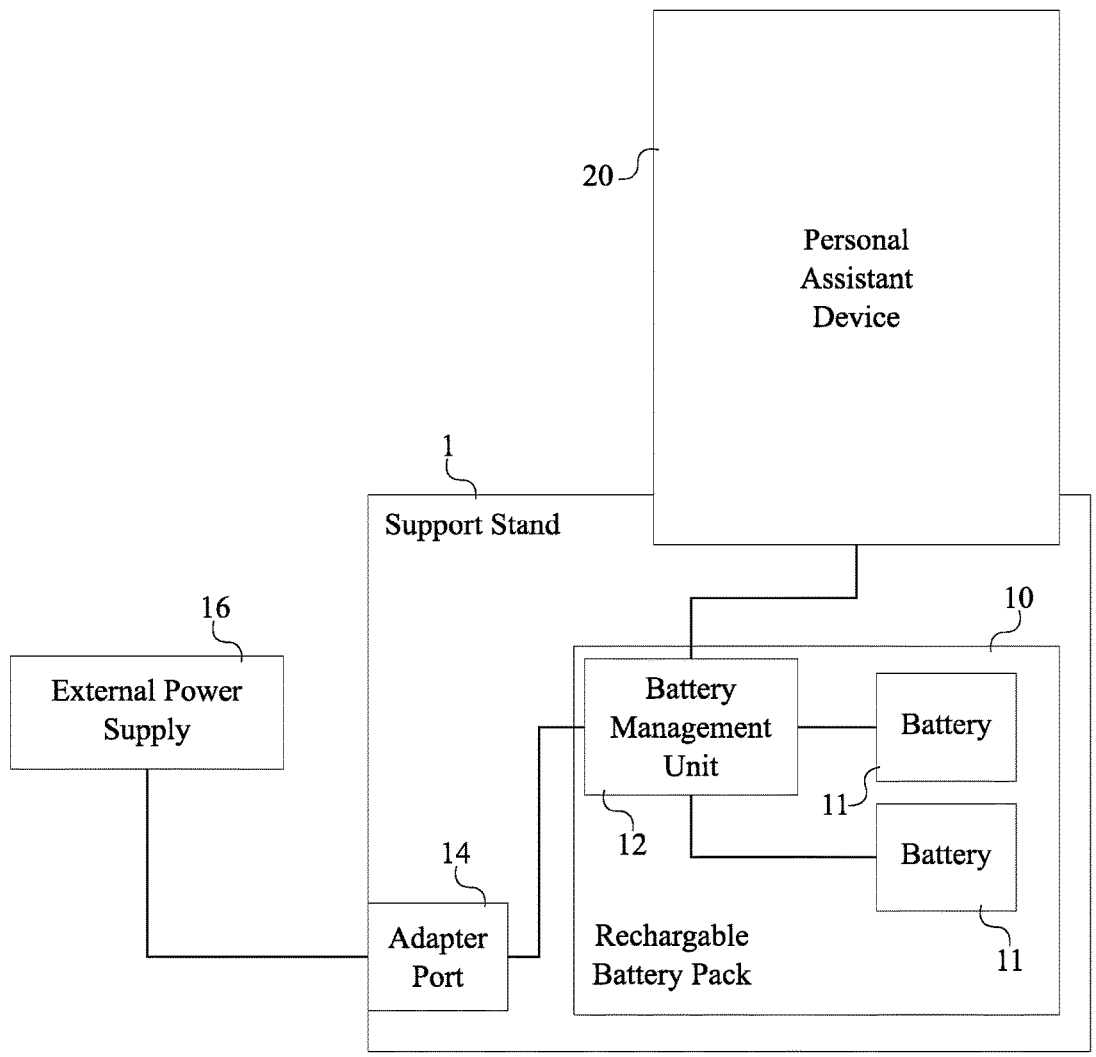
FIG. 7 is schematic diagram of the present invention.

In reference to FIG. 7, the rechargeable battery pack 10 comprises at least one battery 11 and a battery management unit 12. The battery 11 is electrically connected to the battery management unit 12. The battery management unit 12 is used to regulate how much electricity is used to power the personal assistant device. Further, the battery management unit 12 is used to prevent the battery 11 from overcharging. In the preferred embodiment of the present invention, the rechargeable battery pack 10 comprises four batteries 11; however, varying amounts of batteries 11 may alternatively be used.

In reference to FIG. 7, the present invention further comprises an external power supply 16. The external power supply 16 is used to recharge the rechargeable battery pack 10 and may also be used to power the personal assistant device. The external power supply 16 is electrically connected to the rechargeable battery pack 10 through the adapter port 14. In the preferred embodiment of the present invention, a connection to a wall outlet is used as the external power supply 16; however, a generator or other types of external power supplies 16 may alternatively be used. Furthermore, the electrical connection to the external power supply 16 may be made with commercial off-the-shelf products or may be made using an electrical cord specifically designed to optimize the performance of the rechargeable battery pack 10.

Figure 4:
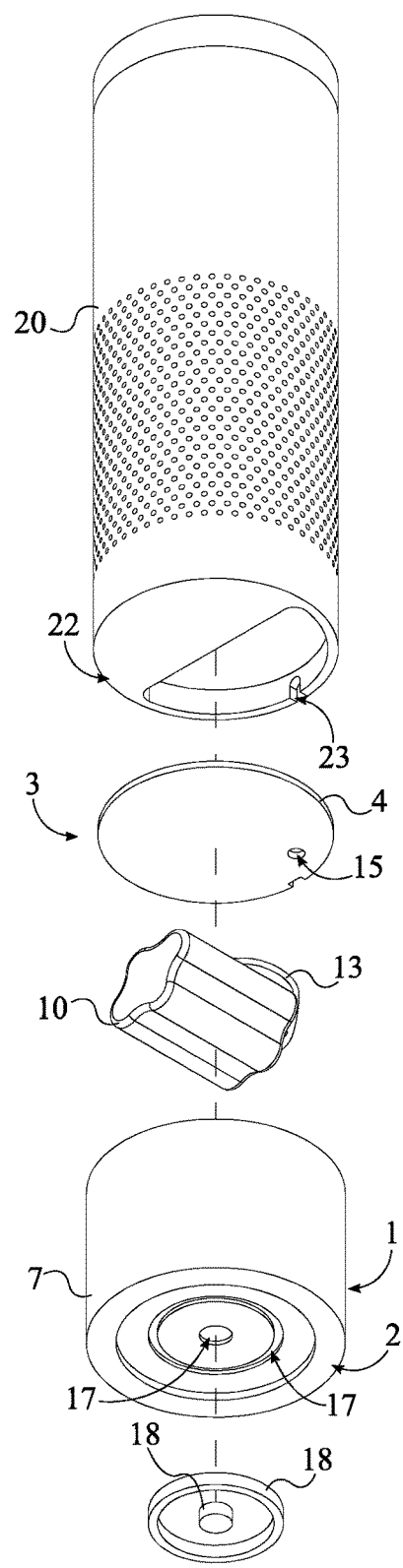
FIG. 4 is an exploded bottom perspective view of the first embodiment of the present invention.

In reference to FIG. 4 and FIG. 6, the present invention further comprises a plurality of base grooves 17 and a plurality of base grips 18. The plurality of base grooves 17 externally traverse into the base 2. The plurality of base grooves 17 is used to secure the plurality of base grips 18 to the base 2. The plurality of base grips 18 is used to prevent the support stand 1 from easily sliding when positioned on an uneven surface or bumped inadvertently. Each of the plurality of base grips 18 is mounted into a corresponding groove from the plurality of base grooves 17. This arrangement helps to ensure that the base grips 18 do not become dislodged from the base 2.

In reference to FIG. 2, the support stand 1 further comprises a light channel 19. The light channel 19 permits indicator lights on the personal assistant device to be seen through the support stand 1. The light channel 19 laterally traverses into the tubular body 7, opposite to the base 2. More specifically, the tubular body 7 comprises an inner surface and an outer surface. The light channel 19 traverses from the inner surface to the outer surface. In the preferred embodiment of the present invention, the light channel 19 traverses into the tubular body 7 in a V-shape; however, the light channel 19 may alternatively be a circular hole or have several other shapes.

In reference to FIG. 1, and FIG. 4, the present invention further comprises a personal assistant device 20. As previously mentioned, the personal assistant device 20 provides several functions aimed at improving convenience for everyday tasks. The personal assistant device 20 is electrically connected to the rechargeable battery pack 10 through the device power cord 13. As previously mentioned, the rechargeable battery pack 10 and the device power cord 13 are used to power the personal assistant device 20 without the external power supply 16. The personal assistant device 20 is mounted into the tubular body 7 and is prevented from rotating with the alignment protrusion 24. The personal assistant device 20 comprises a top end 21, a bottom end 22, and an end groove 23. The end groove 23 traverses into the bottom end 22. Though intended to allow an electrical cord to traverse to the underside of the personal assistant device 20, in the present invention, the end groove 23 is used to secure the personal assistant device 20 relative to the support stand 1. In both embodiments of the present invention, the end groove 23 is engaged with the alignment protrusion 24 in order to prevent the personal assistant device 20 from rotating while mounted on the support stand 1.

Although the invention has been explained in relation to its preferred embodiment, it is to be understood that many other possible modifications and variations can be made without departing from the spirit and scope of the invention as hereinafter claimed.

What is claimed is:

1. A portable device-powering system comprises:
   a support stand;
   a rechargeable battery pack;
   a device power cord;
   an adapter port;
   the support stand comprises a base, a divider cap, and a tubular body;
   the tubular body being perimetrically connected around the base;
   the divider cap being perimetrically connected into the tubular body, offset from the base;
   the rechargeable battery pack being positioned in between the divider cap and the base;
   the adapter port being laterally mounted into the tubular body, in between the divider cap and the base;
   the device power cord being electrically connected to the rechargeable battery pack;
   the adapter port being electrically connected to the rechargeable battery pack;
   the support stand further comprises a plurality of cap-locking struts;

the divider cap comprises a platform and a plurality of support feet;

the plurality of support feet being connected normal to the platform;

the plurality of support feet being oriented towards the base;

the plurality of support feet being equally distributed around the platform;

the plurality of cap-locking struts being laterally connected into the tubular body;

the plurality of cap-locking struts being equally distributed about the tubular body; and each of the plurality of support feet being mounted onto a corresponding strut from the plurality of cap-locking struts.

2. The portable device-powering system as claimed in claim 1 comprises:

the support stand further comprises a support lip;

the support lip being laterally connected into the tubular body;

the support lip being positioned offset from the base; and the divider cap being connected adjacent to the support lip, opposite to the base.

3. The portable device-powering system as claimed in claim 1 comprises:

a cord channel; and the cord channel traversing through the divider cap.

4. The portable device-powering system as claimed in claim 1 comprises: the divider cap comprises a platform and a cord protector; the cord protector being connected normal to the platform; the cord protector being positioned adjacent to the cord channel; and the cord protector being oriented towards the base.

5. The portable device-powering system as claimed in claim 1 comprises:

the rechargeable battery pack comprises at least one battery and a battery management unit; and the battery being electrically connected to the battery management unit.

6. The portable device-powering system as claimed in claim 1 comprises:

an external power supply; and the external power supply being electrically connected to the rechargeable battery through the adapter port.

7. The portable device-powering system as claimed in claim 1 comprises:

a plurality of base grooves; and the plurality of base grooves externally traversing into the base.

8. The portable device-powering system as claimed in claim 7 comprises:

a plurality of base grips; and each of the plurality of base grips being mounted into a corresponding groove from the plurality of base grooves.

9. The portable device-powering system as claimed in claim 1 comprises:

the support stand further comprises a light channel; and the light channel laterally traversing into the tubular body, opposite to the base.

10. The portable device-powering system as claimed in claim 1 comprises:

a personal assistant device;

the personal assistant device being mounted into the tubular body; and the personal assistant device being electrically connected to the rechargeable battery pack through the device power cord.

11. The portable device-powering system as claimed in claim 10 comprises:

an alignment protrusion;

the personal assistant device comprises a top end, a bottom end, and an end groove;

the end groove traversing into the bottom end;

the alignment protrusion being laterally connected into the tubular body;

the alignment protrusion being positioned adjacent to the divider cap; and the end groove being engaged with the alignment protrusion.

12. The portable device-powering system as claimed in claim 10 comprises:

an alignment protrusion;

the divider cap comprises a platform;

the personal assistant device comprises a top end, a bottom end, and an end groove;

the end groove traversing into the bottom end;

the alignment protrusion being connected normal to the platform, opposite to the base;

the alignment protrusion being peripherally positioned on the platform; and the end groove being engaged with the alignment protrusion.

* * * * *